Jan. 11, 1949. J. N. WEILAND 2,458,664
FLUID ACTUATED CLUTCH AND BRAKE MECHANISM
Filed May 2, 1947 3 Sheets-Sheet 1

INVENTOR.
JOHN N. WEILAND
BY
Gustav A. Wolff.
ATT

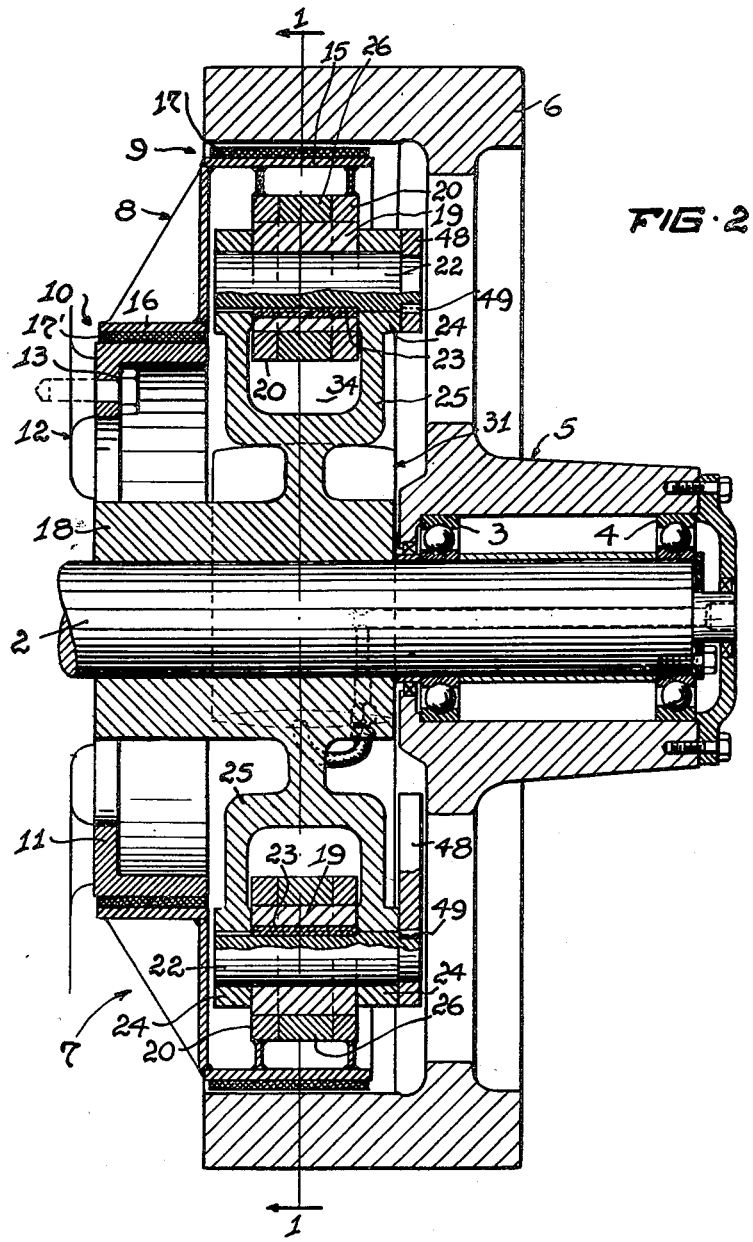

Jan. 11, 1949.   J. N. WEILAND   2,458,664
FLUID ACTUATED CLUTCH AND BRAKE MECHANISM
Filed May 2, 1947   3 Sheets-Sheet 3
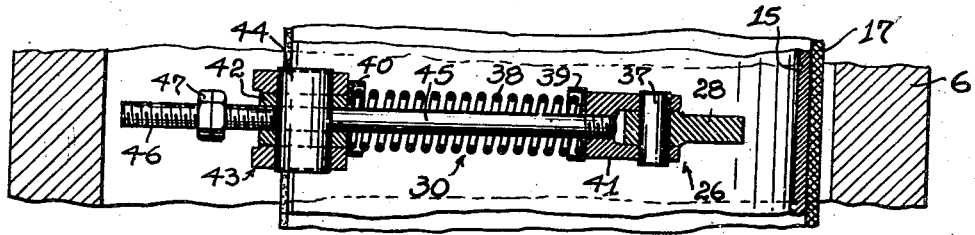
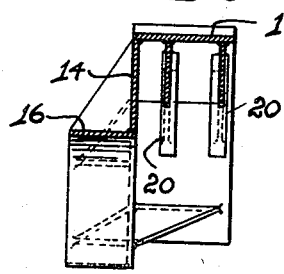
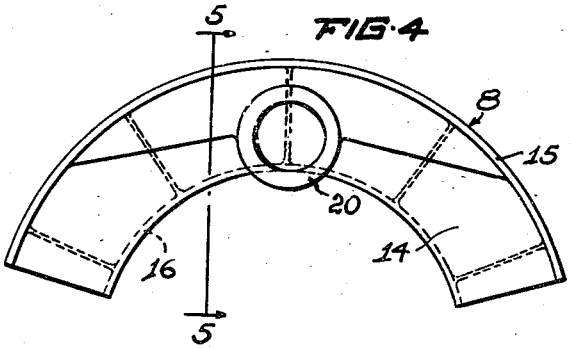
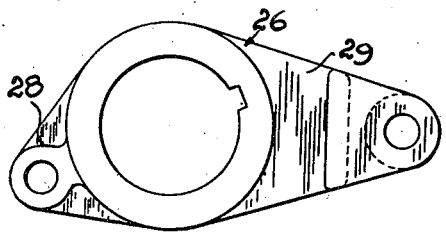
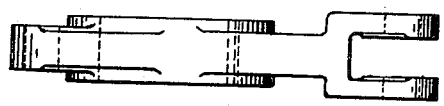
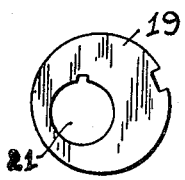
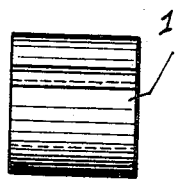
INVENTOR.
JOHN N. WEILAND
BY
ATT.

Patented Jan. 11, 1949

2,458,664

UNITED STATES PATENT OFFICE 2,458,664

FLUID ACTUATED CLUTCH AND BRAKE MECHANISM

John N. Weiland, Cleveland, Ohio, assignor to The Cleveland Punch & Shear Works Co., Cleveland, Ohio, a corporation of Ohio Application May 2, 1947, Serial No. 745,517

14 Claims. (Cl. 192—17)

The present invention relates to clutch and brake mechanism for power presses and other driven machines with continuously driven fly-wheels, which machines through a clutch mechanism transmit the motion and energy of their fly-wheels to the parts to be driven and arrest the motion of the driven parts by brake mechanism actuated upon when the clutch mechanism is disconnected.

The primary object of this invention is the provision of fluid operated clutch and brake mechanism for machines of the type referred to above, which mechanism embodies spring pretensioned, shiftable clutch and brake shoe means and fluid operated shifting devices coupled therewith to effect braking action when the fluid operated shifting devices are inoperative and release such braking action and induce a clutching action when the fluid operated shifting devices are actuated.

Another object of the invention is the provision of fluid operated clutch and brake mechanism for machines of the type referred to above, which mechanism includes spring pretensioned, shiftable clutch and brake means embodying unitary clutch and brake shoes and fluid operated shifting devices coupled with said clutch and brake shoes to effect a braking action when the fluid operated shifting devices are inoperative, and release such braking action and induce a clutching action when the fluid operated shifting devices are actuated.

A further object of the invention is the provision of fluid operated clutch and brake mechanism for machines of the type referred to above, which mechanism includes spring pretensioned, shiftable unitary clutch and brake means embodying unitary clutch and brake shoes and fluid operated shifting devices coupled by lever and eccentric arrangements with said brake shoes to effect equalized braking action of such clutch and brake shoes when the fluid operated shifting devices are inoperative, and release the braking action and induce equalized clutching action of the shoes when the fluid operated shifting devices actuate through the lever and eccentric arrangements upon the shoes.

Still another object of the invention is the provision of fluid operated clutch and brake mechanism for machines of the type referred to above, which mechanism includes shiftable clutch and brake means embodying unitary clutch and brake shoes, fluid operated shifting devices coupled by lever and eccentric arrangements with the clutch and brake shoes and compression spring means actuating upon the lever and eccentric arrangements to effect equalized spring actuated braking action of the clutch and brake shoes when the fluid operated shifting devices are inoperative, and release such braking action and induce equalized clutching action of the clutch and brake shoes when the fluid operated shifting devices actuate through the lever and eccentric arrangements upon the shoes.

A still further object of the invention is the provision of fluid operated clutch and brake mechanism for machines of the type referred to above, which mechanism embodies spring pretensioned, shiftable clutch and brake shoe means, fluid operated shifting devices coupled with said clutch and brake means, and means counteracting centrifugal forces tending to shift the clutch and brake means of said mechanism when such said mechanism is rotating to effect at any desired time proper braking action by said spring pretensioned, shiftable clutch and brake means and proper coupling action when the fluid operated shifting devices are actuated.

With these and incidental objects in view which will appear hereinafter, the invention consists in certain other novel features of construction and combination of parts, the essential elements of which are set forth in the appended claims; and a preferred form of embodiment of the invention is hereinafter shown with reference to the drawings accompanying and forming part of the specification.

In the drawings:

Fig. 2 is a transversal cross-sectional view through the fluid operated clutch and brake mechanism shown in Fig. 1, the section being taken on line 2—2 of Fig. 1.

Fig. 3 is a fragmentary sectional view on line 3—3 of Fig. 1.

Fig. 4 is a side-view of the clutch and brake shoe member.

Fig. 5 is a cross-sectional view on line 5—5 of Fig. 4.

Fig. 6 is a side-view of the actuating lever for the clutch and brake shoe member.

Fig. 7 is a bottom view of the actuating lever shown in Fig. 6.

Fig. 8 is a front view of the eccentric member mounting the clutch and brake shoe and coupled with the operating lever.

Fig. 9 is a side-view of the eccentric member shown in Fig. 8; and

Fig. 10 is a side-view of the pin pivotally connecting the base member of the fluid operated shifting device with the eccentric member.

Figure 1:
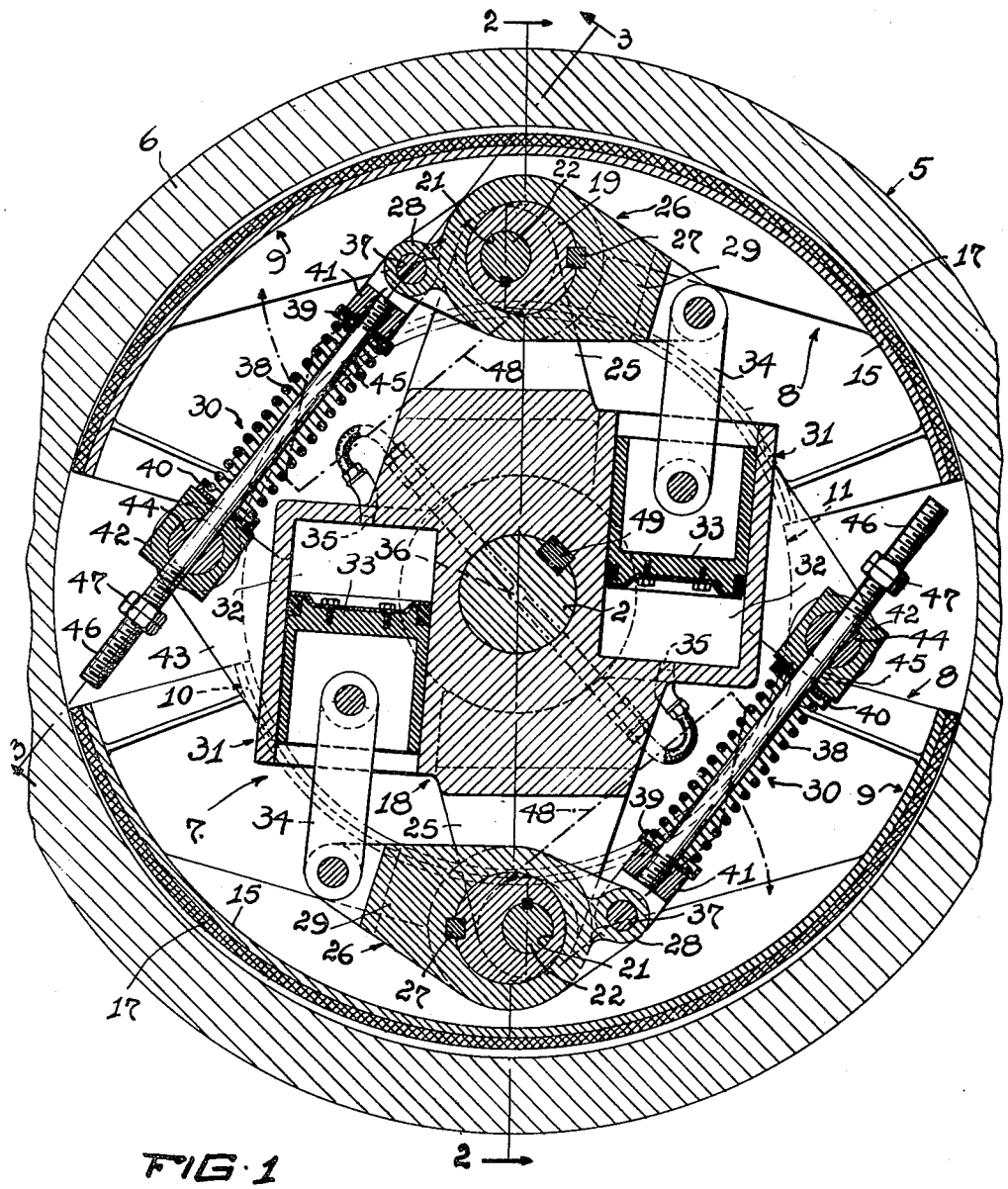
Fig. 1 is a transversal sectional view through a fluid operated clutch and brake mechanism constructed in accordance with the invention, the mechanism being shown attached to and coupled with the driven shaft and fly-wheel of a power driven machine, such as a power press, the section being taken on line 1—1 of Fig. 2 of the drawings.

Referring now in detail to the exemplified form of the invention shown in the drawings, reference numeral 2 denotes the crank-shaft of a power driven machine, such as a power press, which shaft freely rotatably mounts in roller bearings 3 and 4 a fly-wheel 5 driven in any suitable manner. This fly-wheel has the inner cylindrical surface of its rim portion 6 smoothly finished and forms a friction clutch drum member for a clutch and brake mechanism 7 mounted on shaft 2. Mechanism 7 includes oppositely arranged shiftable clutch and brake shoe members 8 with circular flanges 9 and 10, flange 9 being extended into fly-wheel 5 for clutching operations with its rim portion 6 and flange 10 being positioned opposite a brake drum 11 for cooperation therewith, which drum is secured to frame 12 of the power driven machine by bolts 13.

The clutch and brake shoe members 8 are identical in construction, each consisting of a substantially half-circular web portion 14 with half-circular flanges 15 and 16 extended in opposite directions from the curved edges of the web portion. These flanges are lined with brake-lining 17, 17' for clutching or braking action with rim 6 and brake drum 11, respectively. The clutch and brake shoe members 8 are shiftably coupled with base 18 of the clutch and brake mechanism by a short shaft or eccentric 19 which is freely rotatably extended into bearings 20 of clutch and brake shoe members 8. This shaft mounts in an eccentric bore 21 a pin 22 which is extended through said bore, keyed to the shaft 19 by a key 23 and pivotally supported in perforated ear portions 24 of a fork-shaped extension 25 on base 18. Rotation of eccentric 19 on pin 22 effects shifting of clutch and brake shoe members 8, and such rotation is controlled by an actuating lever 26 sleeved upon eccentric 19 and keyed thereto by a key 27. The actuating lever 26 includes two lever arms 28 and 29, lever arm 28, the shorter one, being pivoted to a pretensioned spring arrangement 30 later to be described, and lever arm 29, the longer one, being linked to a fluid operated shifting device 31. This device embodies a cylinder 32 with a piston 33 which is linked to lever arm 29 by a link member 34. Fluid operated shifting device 31 is positively actuated in one direction by fluid entering cylinder 32 through a passage 35 in its bottom wall, which passage openly communicates with a bore 36 in shaft 2 to permit feeding of fluid into cylinder 32 for shifting piston 33 so as to effect outward movement of clutch and brake shoe members 8 into clutching engagement with rim 6.

Fluid operated shifting device 31 is shifted in an opposite direction by the pretensioned spring arrangement 30 pivoted to lever arm 28 of lever 26 by pin 37. This pretensioned spring arrangement embodies a compression spring 38 seated between two spring seat washers 39, 40 which abut a clevis 41 pivoted by pin 37 to lever arm 28 and a block member 42 pivoted to a fork-shaped extension 43 of base member 18 by pin 44. A guide rod 45 threadedly engaged with the clevis and slidably extended through pin 44 guides spring 38 when under compression. Guide rod 45 carries on its threaded end 46 nut members 47 which are arranged to engage block members 42 when the brake lining is worn and should be renewed.

The described clutch and brake mechanism additionally includes means for counteracting centrifugal forces tending to shift the clutch and brake shoe members 8 radially outwardly when the mechanism is rotating. Such means consists of counterweights 48 keyed to pins 22 by key members 49 to be rotated together with short shafts or eccentrics 19. These counterweights are arranged and proportioned to substantially equalize the centrifugal forces acting on clutch and brake shoe members 8 when the mechanism is rotating and insure shifting of the clutch and brake shoe members by the full force stored in pretensioned compression springs 38 of spring arrangement 30.

In operation, when the described clutch and brake mechanism is used as described on a power press with a crank shaft 2, fly-wheel 5 is freely rotatably mounted on shaft 2 and continuously driven as commonly practiced by a motor, pulley and belt arrangement not shown. Starting of the press is effected when fluid is fed into cylinders 32 to shift pistons 33 and therewith rotate actuating levers 26 in an anti-clockwise direction against the force of pretensioned spring arrangement 30. The pivots for such movement of levers 26 are pins 22 pivoted to base 18 rigidly coupled with crank shaft 2 by a key member 49. Movement of actuating levers 26, rigidly coupled with eccentrics 19, effects outward shifting of these membrs and frictional clutching engagement of the lined flanges 15 of these members with the inner cylindrical surface of rim 6 of fly-wheel 5. This clutching engagement transfers rotary movement of the fly-wheel to shoes 8 by means of the eccentrics 19 and pins 22 coupling the shoes with base 18 attached to crank shaft 2. In the clutching position members 8 have their lined flanges 16 disengaged from frictional contact with brake drum 11 and pretensioned spring arrangements 30 have their pretensioned compression springs 38 additionally tensioned. Disengagement of the clutching action of flanges 15 with rim 6 is effected by release of the fluid from cylinders 32. This can be effected in any customary manner and permits springs 38 to rotate actuating levers 26 in a clockwise direction and shifts clutch and brake shoe members 8 inwardly, so that their lined flanges 16 frictionally engage brake drum 11 to stop rotation of base 18 and crank shaft 2 connected therewith.

Having thus described my invention, what I claim is:

1. In clutch and brake mechanism a driving member, a driven member, means affording a stationary braking surface, unitary clutch and brake shoe means, a lever arrangement pivotally connected with said driven member and eccentrically pivoted to said clutch and brake shoe means, and actuating means for said lever arrangement, said lever arrangement adapted to shift said clutch and brake shoe means in opposite directions for selective clutching and braking engagement with said driving member and said stationary braking surface.

2. In clutch and brake mechanism a driving member, a driven member, means affording a stationary braking surface, unitary clutch and brake shoe means, a lever arrangement pivotally connected with said driven member and eccentrically pivoted to said clutch and brake shoe means and two actuating devices for said lever arrangement mounted on said driven member, said lever arrangement including arms coupled with said actuating devices arranged to effect rotation of said lever arrangement in opposite directions to selectively shift said clutch and brake shoe means into clutching and braking engagement with said driving member and said stationary surface.

3. In clutch and brake mechanism a driving member, a driven member, means affording a stationary braking surface, unitary clutch and brake shoe means, a lever arrangement pivotally connected with said driven member and eccentrically pivoted to said clutch and brake shoe means, and two actuating devices for said lever arrangement, said actuating devices including fluid operated means and pretensioned spring means cooperating with said lever arrangement in selectively shifting said clutch and brake shoe means in opposite directions into clutching and braking engagement with said driving member and said stationary surface.

4. In clutch and brake mechanism a driving member, a driven member, means affording a stationary braking surface, unitary clutch and brake shoe means, a lever arrangement pivotally connected with said driven member and eccentrically pivoted to said clutch and brake shoe means, actuating means for rocking said lever arrangement in opposite directions and effect selective shifting of said clutch and brake shoe means into clutching and braking engagement with said driving member and said stationary surface, and weighted means arranged on said driven member and adapted to counteract centrifugal forces on said clutch and brake shoe means when the driven member of said mechanism is rotating.

5. In clutch and brake mechanism a driving member, a driven member, means affording a stationary braking surface, unitary clutch and brake shoe means, a lever arrangement pivotally connected with said driven member and eccentrically pivoted to said clutch and brake shoe means, actuating means for rocking said lever arrangement in opposite directions to effect selective shifting of said clutch and brake shoe means into clutching and braking engagement with said driving member and said stationary surface, and weighted means coupled with said lever arrangement to counteract centrifugal forces on said clutch and brake shoe means proportionate to their distance from the axis of said driven member.

6. A clutch and brake mechanism such as described in claim 3, wherein said fluid operated means include cylinder means in said driven member and piston means shiftably arranged in said cylinder means and linked to said lever arrangement.

7. A clutch and brake mechanism such as described in claim 3, wherein said pretensioned spring means include a compression spring assembly linking said driven member with said lever arrangement.

8. A clutch and brake mechanism such as described in claim 3, wherein said fluid operated means include piston means linked to said lever arrangement, and wherein said pretensioned spring means include a compression spring assembly linking said driven member with said lever arrangement.

9. In clutch and brake mechanism a driving member, a driven member, means affording a stationary braking surface, unitary clutch and brake shoe means including a bearing centrally thereof, a lever arrangement having a shaft pivotally coupled with said driven member and an eccentric pivoted in the bearing of said clutch and brake shoe means, and actuating means associated with said driven member and coupled with said lever arrangement for rocking same on said shaft and effect selectively shifting of said clutch and brake shoe means into clutching and braking engagement with said driving member and said stationary surface.

10. A clutch and brake mechanism such as described in claim 9, wherein said lever arrangement has its shaft non-rotatably supporting a lever between the opposite ends thereof, wherein said actuating means consists of fluid operated means and pretensioned spring means coupling the driven member with the ends of said lever, and wherein said shaft supports at one end counterweight means arranged to rock with said lever arrangement and proportionately counteract centrifugal forces on said clutch and brake shoe means when the driven member of said mechanism is rotating.

11. In clutch and brake mechanism a driving member, a driven member, means affording a stationary braking surface, a plurality of unitary clutch and brake shoe means arranged symmetrically with respect to said driven member, a plurality of symmetrically arranged lever arrangements pivotally connected with said driven members and eccentrically pivotally coupled with the central portions of said clutch and brake shoe means, and a plurality of pairs of actuating means for rocking said lever arrangements in opposite directions to effect simultaneous shifting of all said clutch and brake shoe means for selective clutching and braking engagement with said driving member and said stationary braking surface.

12. A clutch and brake mechanism as described in claim 11, wherein the pairs of actuating means for said lever arrangements each consists of a spring assembly linked to one end of one of said lever arrangements and a fluid operated means having a cylinder arranged in the driven member and a shiftable piston linked to the other end of said one lever arrangement, and wherein all said cylinders are in open communication with each other.

13. The combination of a power driven machine having a frame, a crank-shaft and a fly-wheel with a clutch and brake mechanism mounted on said crank-shaft opposite the rim portion of said fly-wheel and co-axial therewith, said clutch and brake mechanism including a driven member secured to said crank-shaft, unitary frictional clutch and brake shoe means, a lever arrangement pivotally connected with said driven member and eccentrically pivoted to the central portion of said brake shoe means, said frame including means affording a stationary braking surface, and actuating means for said lever arrangement coupled with said driven member and lever arrangement to effect rocking of said lever arrangement in opposite directions for shifting said clutch and brake shoe means into clutching engagement with said rim and braking engagement with said stationary braking surface.

14. The combination of a power driven machine and clutch and brake mechanism as described in claim 13, wherein the means affording a stationary braking surface consists of a brake drum secured to said frame adjacent to said fly-wheel, and wherein said unitary frictional clutch and brake shoe means embodies a curved body, a curved vertical web portion and lined flanges laterally extended from opposite sides of said web portion for clutching engagement with the inner surface of the rim of said fly-wheel and braking engagement with said brake drum.

JOHN N. WEILAND.

REFERENCES CITED

The following references are of record in the file of this patent:

UNITED STATES PATENTS

| Number | Name | Date |
|---|---|---|
| 1,566,111 | Miller | Dec. 15, 1925 |
| 2,023,597 | Klacke et al. | Dec. 10, 1935 |